June 26, 1923.
L. A. SEISS
1,460,145
WHEEL AND SHAFT AND METHOD OF INTERLOCKING SAME
Filed May 6, 1922
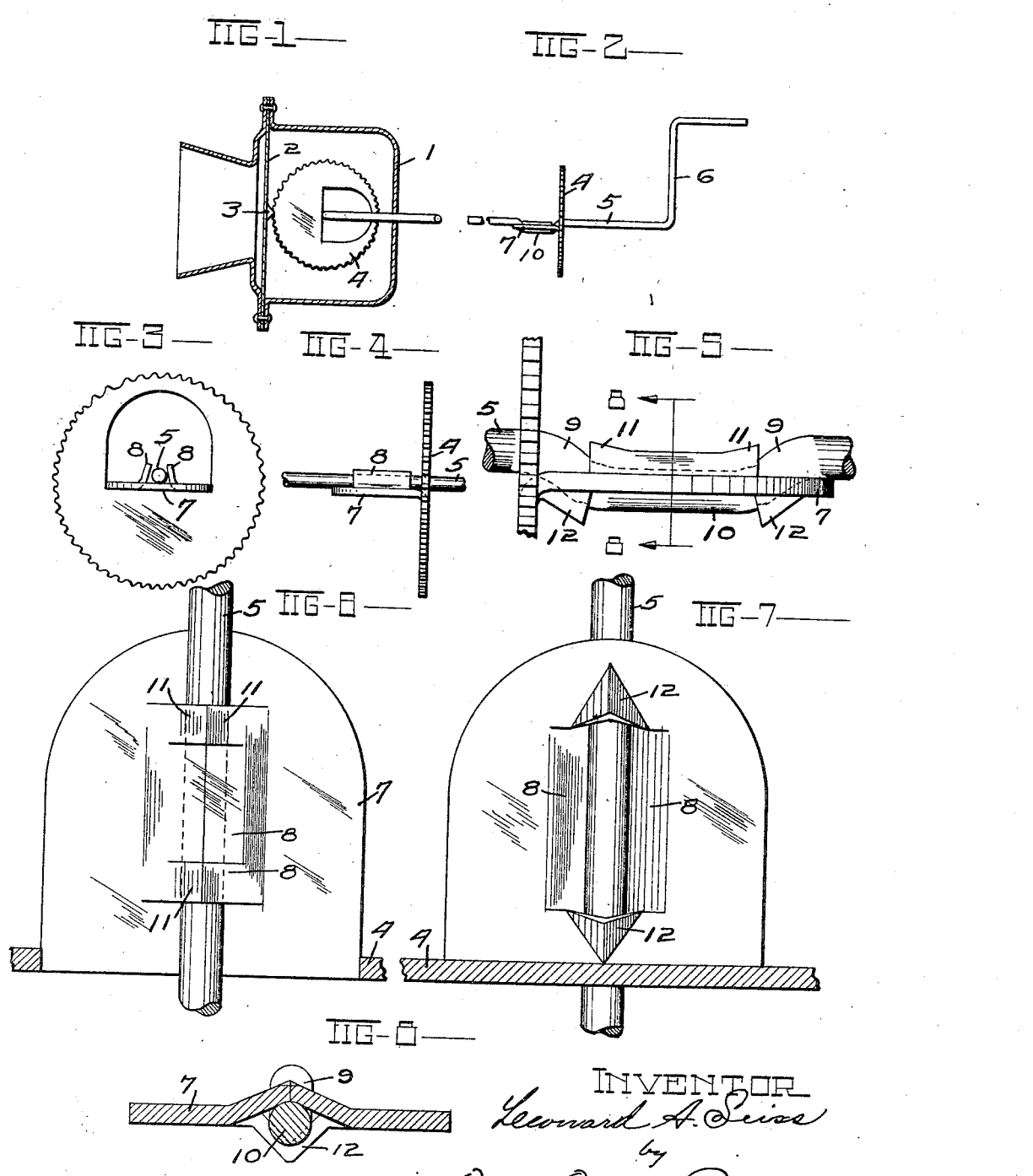

Patented June 26, 1923.

1,460,145

UNITED STATES PATENT OFFICE.

LEONARD A. SEISS, OF TOLEDO, OHIO.

WHEEL AND SHAFT AND METHOD OF INTERLOCKING SAME.

Application filed May 6, 1922. Serial No. 559,047.

*To all whom it may concern:*

Be it known that I, LEONARD A. SEISS, a citizen of the United States, and a resident of Toledo, in the county of Lucas and State of Ohio, have made an Invention Appertaining to Wheels and Shafts and Methods of Interlocking Same; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a simple and yet efficient means for connecting the sound wheel of a horn to the shaft used to rotate the wheel whereby the wheel may be rigidly connected to the shaft by a die pressing operation.

Structures containing the invention may in their details partake of different forms. To illustrate a practical application of the invention, I have selected a structure containing the invention as an example of such structures, and shall describe it hereinafter. The structure selected is illustrated in the accompanying drawings.

Figure 1 of the drawings illustrates a horn having the wheel and shaft that are connected together by the means involving my invention. Fig. 2 illustrates an edge view of the wheel of the shaft and shows a crank for rotating the wheel. Fig. 3 is a side view of the wheel showing its position relative to the shaft when rigidly connected to the shaft. Fig. 4 illustrates an edge view of the wheel and a side view of a part of the shaft before the shaft is connected to the wheel. Fig. 5 is an enlarged edge view of the wheel and a side view of the shaft when the two have been secured together. Fig. 6 is a top view of the device illustrated in Fig. 5. Fig. 7 is a bottom view of the same, and Fig. 8 is a sectional view taken on the line 8—8 indicated in Fig. 5.

1, Figure 1, is the shell of the horn which is provided with the usual diaphragm 2. A button or knob 3 is secured to the central portion of the diaphragm 2 and the wheel 4 having a serrated edge is located in the shell 1. It is secured to the shaft 5 and is rotated by means of the crank 6. The edge of the wheel 4 is located so that it will rub upon the button or knob 3 when the crank 6 is rotated which produces the sound in the manner well known in the art.

In order to secure the wheel to the shaft 5 the wheel is provided with a cut extending around three sides, one side being substantially cylindrical and the portion of the wheel, which is formed of sheet metal, is bent to one side of the wheel leaving an oblong opening having one end semi-circular and the other end straight. The portion 7 that is thus bent to one side of the wheel extends at right angles to the side of the wheel and is located in a plane that is parallel to the axis of the wheel and at a distance from the axis of the wheel which is about equal to the radius of the shaft or rod to which the wheel is to be connected.

The portion 7 is also provided with cuts, one extending parallel to the axis of the wheel and along the line tangential to the shaft when the axis of the shaft coincides with the axis of the wheel. Two transverse cuts are made at the ends of the cut located parallel to the axis of the shaft, and the portions of the part 7 defined by the cuts are bent to the side of the part 7 on which the axis of the wheel is located forming two lips between which the shaft may be inserted and also may be so placed that its axis will coincide with the axis of the wheel. When therefore the shaft is placed in position between the lips 8 and the part 7 they may be folded over the shaft 5 by a die and pressure brought to bear upon their edges to securely connect the shaft to the wheel. An enlarged view of the parts when the two are thus rigidly connected together are shown in Figs. 5 to 8, inclusive. The result of thus forcing the edges of the lips together and pressing the lips 8 down against the shaft 5 and the part 7 is to bend the shaft 5 into the form of the crank shaft forcing a part thereof below the surface of the opposite side of the part 7 and forming inclined parts in the shaft that connect the said part which is forced through the opening formed by bending the lips 8 to the body portion of the shaft. This causes portions 12 of the part 7 located at the ends of the opening formed by the lips 8 to be pressed downward and to conform to the under sides of the sloping or inclined portions 9 of the shaft that join the portion 10, located well within the opening formed by turning upwards the lips 8, to the body portion of the shaft and also causes the ends 11 of the lips to conform to the top side of the sloping portions 9 of the shaft and at the same time the corners of the portions 11 where they contact with the shaft penetrate the surface of the shaft at these points with the result that the shaft is rigidly secured to the wheel, quite as rigidly as though they were formed integral therewith. The connection will thus prevent endwise as well as rotative movement of the wheel relative to the shaft and yet such connection may be readily and quickly produced by a simple die and by a die press. By this means the wheels and shaft may be readily formed and connected.

I claim:

1. In a means for connecting a wheel to a shaft, a part of the wheel extending at right angles to the wheel, a pair of lips extending from the said part of the wheel, the part having an opening located below the lips, the shaft located between the said lips and the said part, the shaft having a part located in the opening, and sloping portions connecting the said part of the shaft with the body portion of the shaft, the ends of the said lips and portions of the part of the wheel conforming to the shape of the portions of the shaft that connect the said part of the shaft with the body portion of the shaft.

2. The process of connecting a sheet metal wheel to a shaft, which consists in bending a central portion of the wheel at right angles to the face of the wheel and bending central portions of the first named portion at an angle to the first named portion and positioning the shaft between the first named portion and the second named portions and forcing a portion of the shaft into the opening formed in the first named portion by bending the second named portions and forcing the second named portions towards each other and against the portion forced in the said opening and causing the ends of the said portions to conform to the parts of the shaft that connect with the portion forced into the said opening with the body of the shaft.

In testimony whereof I have hereunto signed my name to this specification.

LEONARD A. SEISS.